United States Patent
Spahr et al.

(10) Patent No.: US 8,113,593 B2
(45) Date of Patent: *Feb. 14, 2012

(54) WHEEL AND SPOKE FASTENING SYSTEM, IN PARTICULAR FOR BICYCLES

(75) Inventors: Stefan Spahr, Lengau (CH); Martin Walthert, Bern (CH); Andreas Reuteler, Biol/Bienne (CH)

(73) Assignee: DT Swiss Inc., Grand Junction, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/897,528

(22) Filed: Aug. 30, 2007

(65) Prior Publication Data

US 2008/0054713 A1 Mar. 6, 2008

(30) Foreign Application Priority Data

Aug. 31, 2006 (DE) .......................... 10 2006 040 919

(51) Int. Cl.
*B60B 21/06* (2006.01)
*B60B 1/04* (2006.01)

(52) U.S. Cl. ........................................... 301/58; 301/61
(58) Field of Classification Search .................... 301/55, 301/56, 58, 59, 61, 74, 75, 80, 81, 104, 110.5, 301/110.6; 29/894.33, 894.333, 894.341, 29/894.342

See application file for complete search history.

(56) References Cited

U.S. PATENT DOCUMENTS

| | | | | |
|---|---|---|---|---|
| 476,433 A | * | 6/1892 | Vetterlein | 301/58 |
| 2,937,905 A | * | 5/1960 | Altenburger | 301/58 |
| 5,769,584 A | * | 6/1998 | Claes | 411/427 |
| 5,829,844 A | * | 11/1998 | Slankard et al. | 301/110.5 |
| 6,409,278 B1 | * | 6/2002 | Nakajima | 301/59 |
| 6,536,849 B1 | * | 3/2003 | Okajima et al. | 301/58 |
| 6,776,460 B1 | * | 8/2004 | Lo | 301/58 |
| 6,890,040 B2 | * | 5/2005 | Chen | 301/58 |
| 7,357,460 B2 | * | 4/2008 | Schlanger | 301/104 |
| 7,448,696 B2 | * | 11/2008 | Meggiolan et al. | 301/58 |

FOREIGN PATENT DOCUMENTS

| | | |
|---|---|---|
| CH | 355041 | 6/1961 |
| DE | 20 2006 009 7 U1 | 11/2006 |
| EP | 1260382 | 11/2002 |
| EP | 1 422 078 A1 | 5/2004 |
| GB | 1294554 | 11/1972 |
| WO | WO 2005/072989 A1 | 8/2005 |

* cited by examiner

*Primary Examiner* — Kip T Kotter
(74) *Attorney, Agent, or Firm* — Greer, Burns & Crain, Ltd.

(57) ABSTRACT

A wheel for a bicycle including a rim and having a hub including a fixed hub axle and a hub body rotatably mounted relative to the hub axle, and having a plurality of spokes disposed between the hub body and the rim to non-rotatably connect the rim with the hub body. The rim includes two rim flanks, a rim well and a rim base with spoke holes, at which the spokes are received. A separate holding member is disposed in each spoke hole, which together with a spoke nipple received at the holding member can be passed through the spoke hole in a tilted position, while in a tilted-back position it contacts the rim and is received therein to be tension-proof so as to fix the spoke to the rim.

17 Claims, 6 Drawing Sheets

Figure 1:
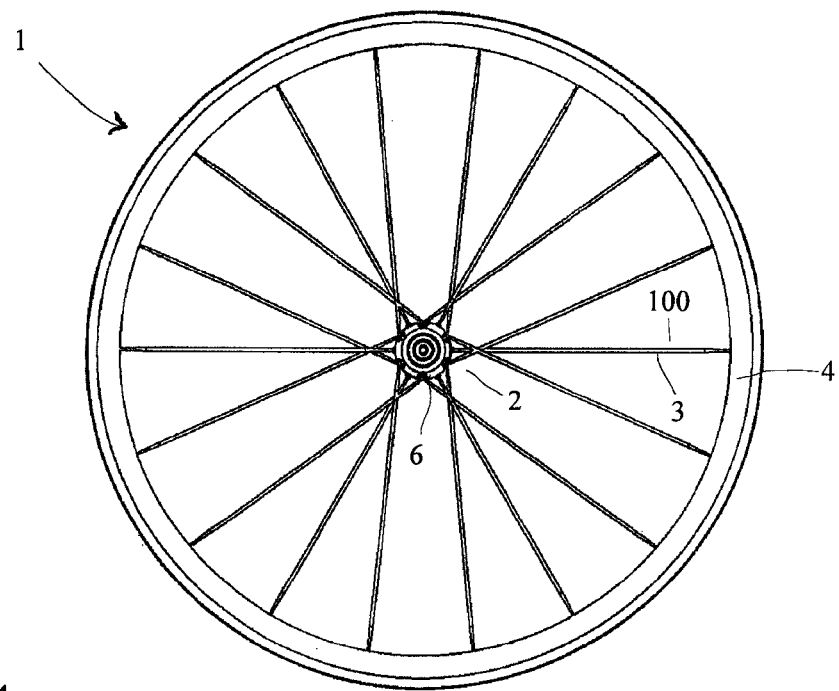

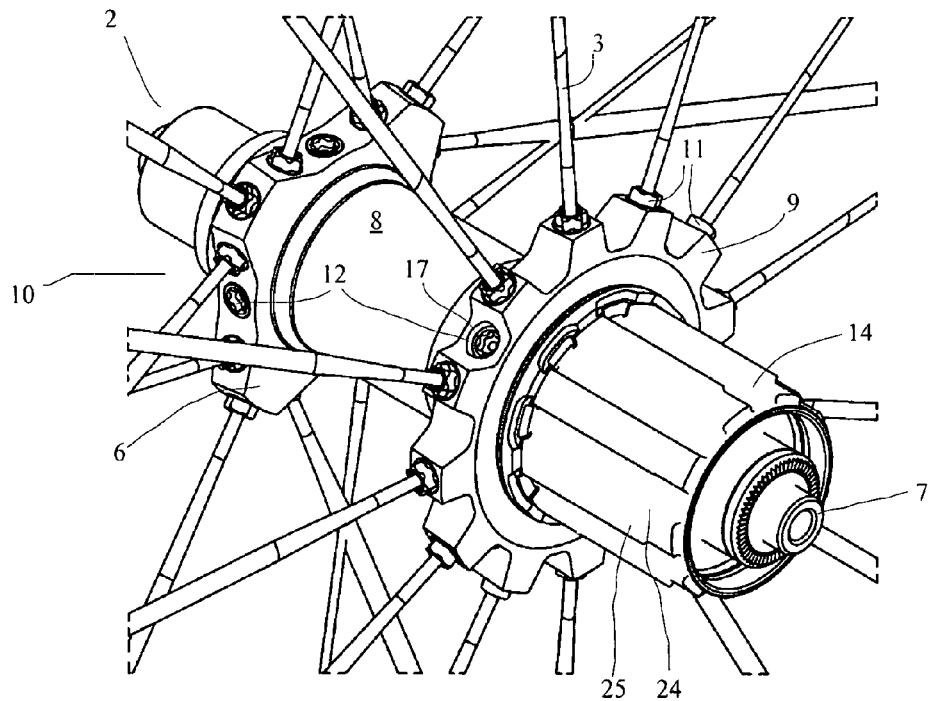
Fig. 3
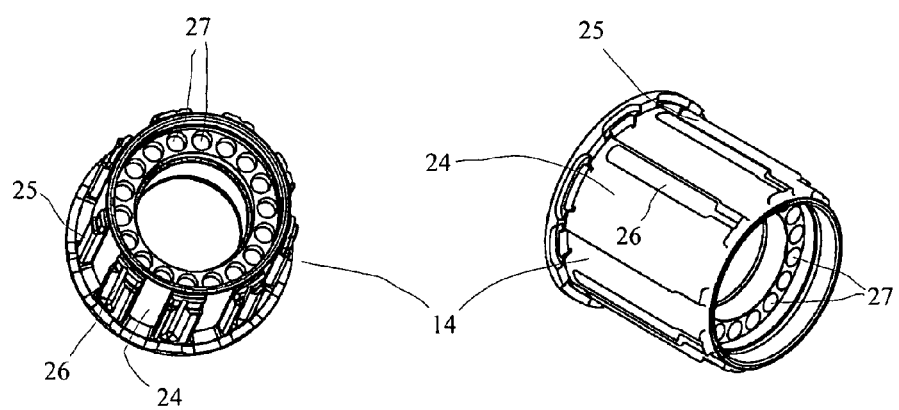
Fig. 4
Fig. 5

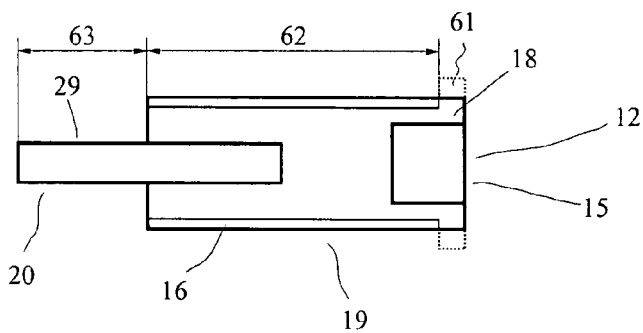
Fig. 7
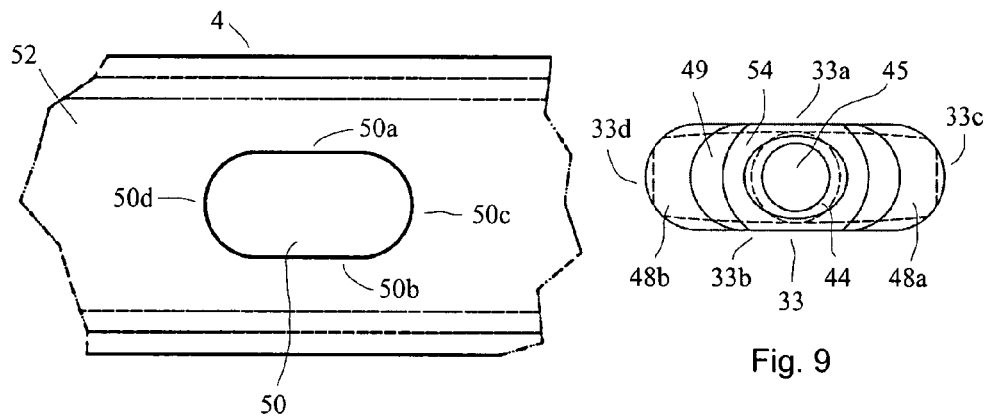
Fig. 8
Fig. 9
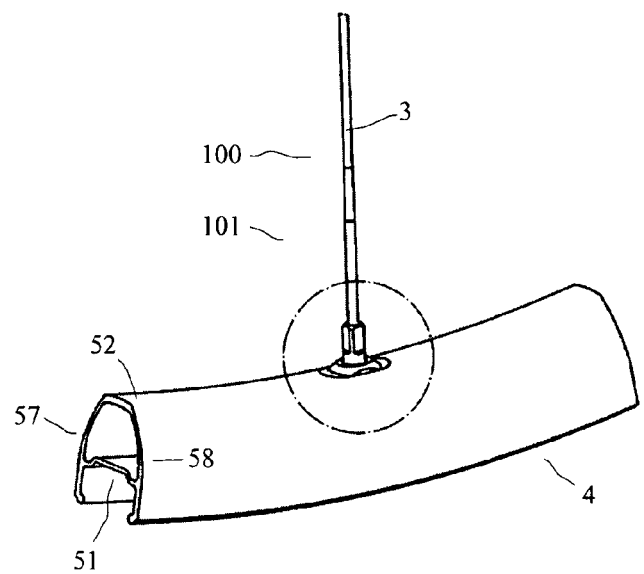
Fig. 10

WHEEL AND SPOKE FASTENING SYSTEM, IN PARTICULAR FOR BICYCLES

The invention relates to a wheel and a spoke fixing system, in particular for bicycles. The invention may be used for both front wheels and rear wheels where as a rule one or more sprockets are disposed.

In the field of amateurs and in professional cycling, the stress tolerance, weight and ease of maintenance of components are a decisive factor since the users value high-quality, lightweight, and easily maintained components.

Heavy load capacities are offered by the currently commonly employed hollow rims which comprise, a radially inwardly rim base, a rim well disposed radially further outwardly, and two lateral rim flanks connecting the rim base and the rim well. The spokes are received at the rim base by way of the spoke nipples. For mounting, the spoke nipples are inserted from outside through holes in the rim well and received in holes in the rim base. The holes in the rim base are dimensioned such that the nipple heads are larger in their outer diameters than is the diameter of the holes in the rim base. In this way the spokes are reliably retained at the rim base. The drawback with these known rims is, however, that the use of tubeless tires is difficult since the holes in the rim well require extensive sealing.

To solve this problem, U.S. Pat. No. 6,536,849 B1 has disclosed a wheel and a rim, wherein the radially outwardly ends of the spokes are received in spoke openings on the rim flanks. The spoke ends are retained inside the hollow rims by means of reinforcement members. For mounting, the spokes provided with the reinforcement members are inserted into the spoke openings on the rim flanks at an angle and from this tilted position they are tilted back to assume the provided position. Therein, inwardly and outwardly projections of the reinforcement members bear against the inside and outside of the rim flanks such that the spoke is received on the rim flank to be tension-proof in the radially inwardly direction. The drawback of this known system is the complicated design of the rim flanks. What is also complicated is that spoke tensioning must be done by way of rotating the hub nipples provided on the hub. The room available for applying tools is limited such that mounting and maintenance are complicated.

EP 1 422 078 A1 has disclosed another spoke wheel where a spoke attaching member is provided inside the hollow rim. Again, the rim base does not require holes to pass the spoke nipples through since the spoke attaching members are inserted into the rim hollow from radially inwardly together with the spoke nipples and the spoke in an inclined, tilted position. After tilting back, the spoke attaching member is received at the rim base to be tension-proof to radially inwardly forces. Since the spoke nipples screwed onto the spoke tips are in direct contact with the spoke attaching members and protrude radially inwardly through the rim base, the required spoke tension can be applied on the spoke nipples with a tool at the radially outwardly spoke ends, which facilitates mounting. The drawback of this known system is, however, that the spoke attaching members are elongated in shape and disposed with their longitudinal extension transverse to the peripheral direction in the rim base, so as to provide only small support surfaces in the rim base. Thus, a large wall thickness of the rim base is required to provide the required sturdiness of the wheel. Furthermore the spoke nipple is received to fit precisely in the spoke attaching member such that high transverse forces and high buckling and shearing stresses occur in the spoke which may lead to increased spoke breakage.

Therefore it is the object of the present invention to provide a spoke fixing system and a corresponding wheel so as to achieve a low weight while allowing the use of tubeless tires and largely avoiding harmful spoke stresses.

The wheel according to the invention is in particular suitable to be used with a bicycle and particularly preferably with a sports bicycle, comprising a rim and a hub which comprises a fixed hub axle and a hub body which is rotatable relative to a hub axle. Furthermore a plurality of spokes positioned between the hub body and the rim is provided so as to non-rotatably connect the rim with the hub body. The rim comprises radially outwardly a rim well and radially further inwardly, a rim base provided with spoke holes, said rim well and said rim base being laterally connected in the radial direction by means of two rim flanks. The rim base is provided with spoke holes wherein each spoke hole is provided with a separate holding member which can be passed through the spoke hole in a tilted position together with a spoke nipple received at the holding member, while in a tilted-back position it contacts the rim in which it is received to be tension-proof in the radially inwardly direction so as to fix the spoke to the rim. In the wheel according to the invention the spoke holes are elongated in shape or are configured elongated, extending so as to be longer in the peripheral direction of the wheel than in the axial direction. The holding member and the spoke nipple are configured so as to allow an angularly variable orientation of the spoke relative to the rim. To this end the nipple head is configured rounded, and it is received in a nipple head seat of the holding member which is configured rounded.

The wheel according to the invention offers considerable advantages. The design according to the invention provides a wheel which allows a lightweight structure. The holding member according to the invention allows a distribution of the acting forces over a considerably larger surface such that the wall thickness of the rim base can be reduced as a whole. In this way the sturdiness of the wheel is retained while the total weight is reduced.

The design of the holding member with a rounded shape of the nipple head seat and the rounded shape of the nipple head allows a transmission of large forces while at the same time allowing an optimal orientation of the spoke nipple and the spoke positioned therein. The spoke nipple and thus the spoke itself can be optimally orientated in their angles so as to largely avoid harmful transverse forces, bending and buckling stresses acting on the spoke. In this way the causes for most spoke breakages is eliminated while providing a spoke wheel having a hollow rim in which the structure does not require any openings in the rim well for inserting the spoke nipples through the rim well from outside.

Advantageously the holding member comprises a through bore in which the spoke nipple with its nipple body is positioned. An inner diameter of the through bore is larger than an outer diameter of the nipple body, while the nipple body provided at the spoke nipple is larger in its outer diameter than is the inner diameter of the through bore. In this way it is ensured that on the one hand the spoke nipple with its nipple head is securely received at the holding member while on the other hand the nipple body can be tilted in mounting such that the spoke nipple and the spoke can be optimally adjusted to the conditions present during mounting. Harmful influences due to bending and shear stresses which may occur in an immovably received spoke nipple are thus largely avoided according to the invention such that the number of spoke breaks in this kind of wheels for tubeless tires can be clearly reduced.

Preferably the nipple head is disposed without play in or at the nipple head seat so as to allow a firm seat although the nipple head may move in the nipple head seat. The nipple head comprises in particular a spherical or ball-shaped support surface wherein the nipple head seat preferably also comprises a spherical or ball-shaped support area.

In all of the embodiments the spoke nipple in particular comprises a through hole with an inner thread for fixing the spoke with the inner thread preferably extending only over part of the length of the spoke nipple. Preferably the through hole comprises at its end opposite the nipple head a threadless portion with an enlarged inner diameter over a length to thus maintain a radial distance from the spoke over said length.

In all of the embodiments the holding member preferably comprises substantially parallel long sides and at the transverse sides, rounded ends. The holding member in particular comprises support surfaces only at the two longitudinal ends. The support surfaces in particular reach behind the rim base and they are in particular configured larger than the largest cross-section of the spoke nipple transverse to the longitudinal extension of the spokes less the cross-section of the nipple body. This means that the support surfaces in total or else individually, are larger than the support surface of the spoke nipple on the holding member.

It is particularly preferred for the thickness of the holding member to be larger than a thickness of the rim base. The thickness of the holding member in particular around the through bore is larger than the thickness of the rim base so as to achieve an optimal absorption and transmission of the spoke forces. The through bore may be manufactured by boring after the holding member has been manufactured. It is also conceivable though to manufacture the through bore as a through hole with other means. The through bore may in particular be provided as an opening during manufacture of the holding member.

In all of the embodiments the hub preferably comprises two separate hub flanges wherein the spokes are fixed to said separate hub flanges. The hub flanges are slid onto the hub sleeve and connected with the hub sleeve by way of radial connecting members. Preferably the connecting members comprise cylindrical pin parts protruding radially inwardly from the hub flanges into the hub sleeve to thus allow a non-rotatable connection of the separate hub flanges with the hub sleeve, while concurrently the forces acting radially on the hub flanges are not transmitted to the hub sleeve since the cylindrical pin parts do not transmit any forces in their longitudinal direction.

In such a configuration the spokes are preferably connected with the hub by means of hub nipples. Mounting the wheel may occur in such a way that firstly a holding member is slid onto the end of a spoke onto which the spoke nipple is then screwed. The holding member with the spoke nipple is inserted in a spoke hole of the rim base in a correspondingly tilted position such that after tilting, the other end of the holding member also enters the hollow of the hollow rim and by way of a retracting movement is received in the rim base to be tension-proof.

Then the radially inwardly spoke end is screwed into the hub nipple which is disposed on the hub flange. The effective spoke tension is finally generated by way of rotating the spoke nipple with a conventional tool. The wheel according to the invention can thus be mounted in a simple way. The spoke fixing system according to the invention is in particular suitable to be used with one of the configurations described above, comprising at least a spoke, a spoke nipple, and a holding member to receive the spoke nipple at a rim. The separate holding member is elongated in shape, extending when mounted to be longer in the peripheral direction of a wheel than in the axial direction. The separate holding member is suitable to be inserted through a corresponding hole in a tilted position together with a spoke nipple received on the holding member, while in a tilted-back position it contacts the rim and is received therein to be tension-proof to thus fix the spoke to the rim. The holding member and the spoke nipple are configured so as to allow an angularly variable orientation of the spoke nipple and the holding member. To this end the nipple head is configured rounded and when mounted it is received in a nipple head seat of the holding member which is configured rounded.

The spoke fixing system according to the invention also has considerable advantages since it allows a low-stress mounting of the spoke fixing system. Bending or shearing stresses due to an immovably held spoke are reliably avoided through the spoke fixing system according to the invention so as to clearly reduce the number of spoke breakages.

Advantageously the holding member comprises a through bore in which the spoke nipple when mounted is positioned with its nipple body. An inner diameter of the through bore is larger than an outer diameter of the nipple body, while the nipple body provided at the spoke nipple is larger in its outer diameter than is the inner diameter of the through bore to thus allow a reliable hold. The fact that the inner diameter of the through bore is larger than the outer diameter of the nipple body allows an angularly variable orientation of the spoke nipple and thus of the spoke relative to the holding member.

In all of the embodiments the holding member comprises in particular at its two ends a flange each, intended to reach behind the rim base when mounted. The flanges reliably transmit the forces occurring to the rim base. The longitudinal sides of the holding member are in particular substantially parallel while the flanges are located at the transverse sides.

In all of the embodiments the holding member in particular consists of a lightweight material and may be of a light metal or a fiber-reinforced plastic manufactured e.g. by injection molding.

The embodiment according to the invention allows a wide variety of color designs and thus optically appealing effects, wherein the holding members are designed in a first color while the remainder of the rim is designed in a second color. It is also conceivable to have individual or a number of holding members in a sequence of different colors so as to allow a flexible color design of the wheel.

To affix the spokes to the spoke nipples and/or to affix the spokes to the hub nipples, an adhesive may be provided in the respective nipples in the corresponding threaded portion which can in particular be activated by screwing in the spokes. The adhesive may comprise two or more different components which are activated by screwing, such that after inserting the spokes the glue hardens, ensuring a firm though removable seat of the spoke.

Further advantages and features can be taken from the exemplary embodiments described below with reference to the enclosed Figures.

Figure 2:
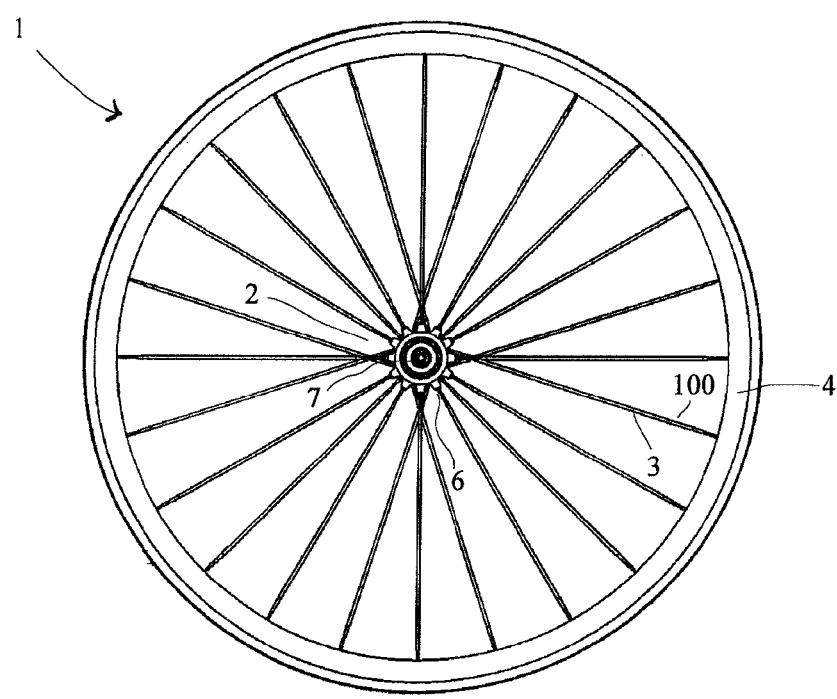
Figure 6:
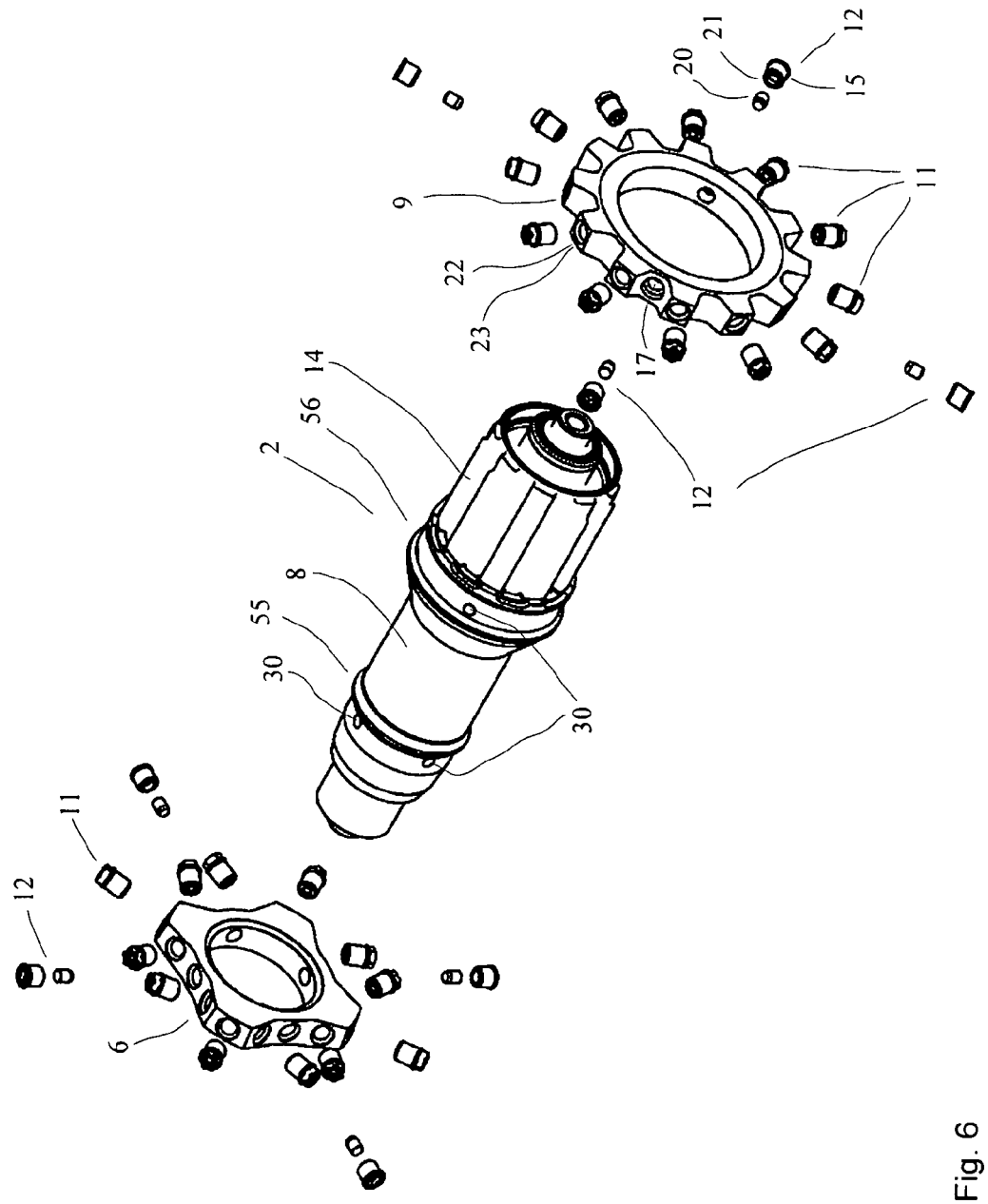
Figure 11:
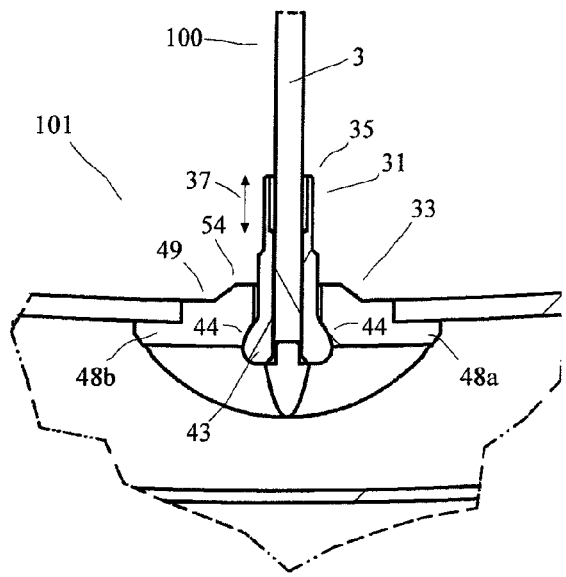
Figure 12:
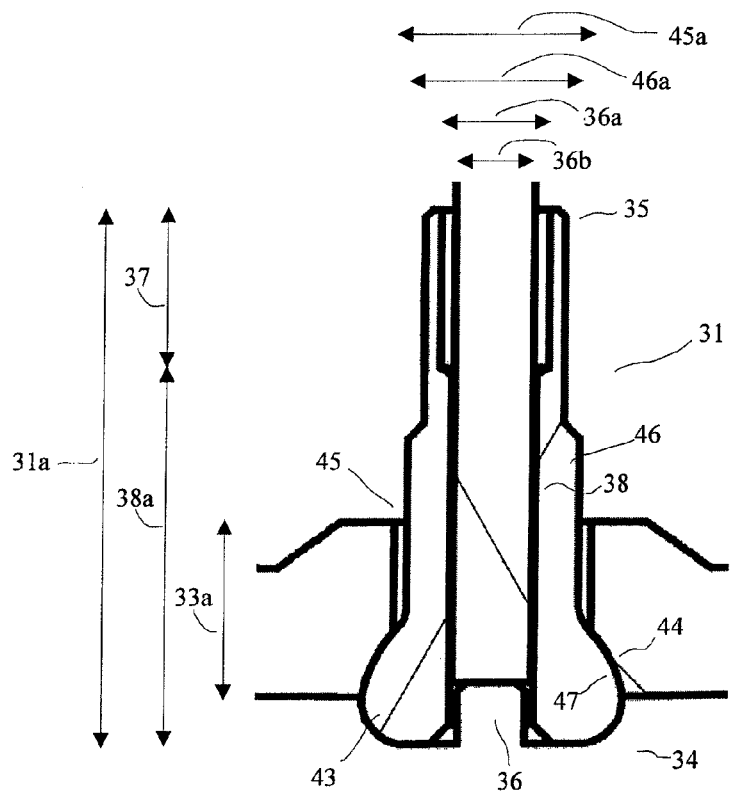
Figure 13:
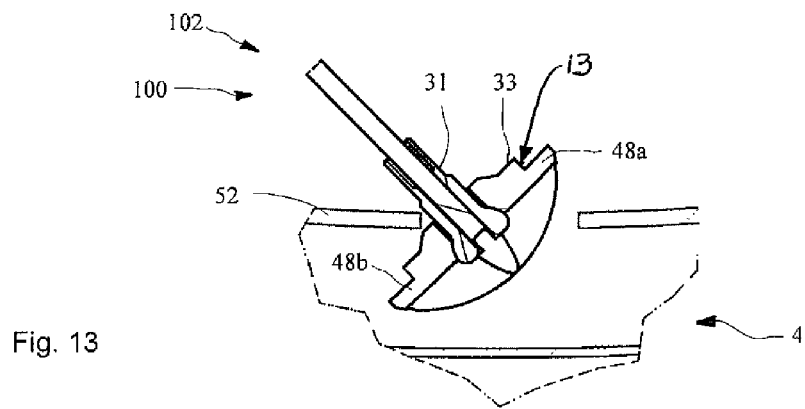
Figure 14:
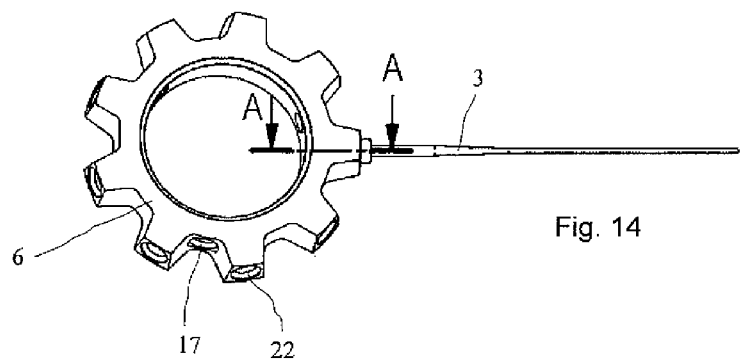

The Figures show in:

FIG. 1 an inventive front wheel in a side view;
FIG. 2 an inventive rear wheel in a side view;
FIG. 3 an inventive rear wheel in a perspective view;
FIG. 4 the rotor of the rear wheel hub according to FIG. 3 in a first perspective view;
FIG. 5 the rotor of the rear wheel hub according to FIG. 3 in a second perspective view;

FIG. 6 an exploded perspective view of the rear wheel hub according to FIG. 3;

FIG. 7 a schematic side view of a connecting member;

FIG. 8 a top view of a portion of a rim base;

FIG. 9 a top view of a holding member;

FIG. 10 a perspective view of a portion of a rim;

FIG. 11 an enlarged lateral cross-section of the rim-spoke connection;

FIG. 12 the spoke nipple at the holding member according to FIG. 11, enlarged still further;

FIG. 13 inserting the spoke nipple into the rim;

FIG. 14 a perspective view of a hub flange; and

Figure 15:
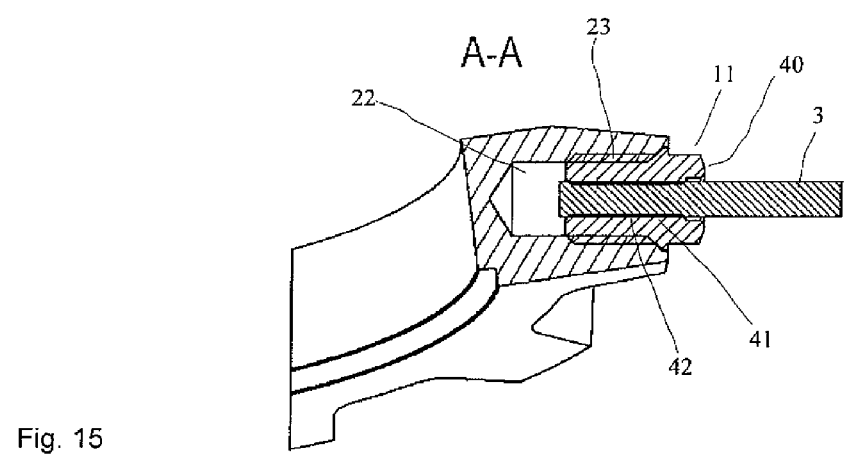

FIG. 15 the enlarged detail A-A from the view of FIG. 14.

FIGS. 1 and 2 illustrate two inventive wheels with different spoke arrangements in side views, each comprising a hub 2, a rim 4 and provided between the hub and the rim, spoke fixing systems 100 comprising, spokes 3, spoke nipples 31 and holding members 33 or nipple supports 33. There may further be provided hub nipples 11 for connecting the spoke fixing system 100 with the hub.

For mounting, the spoke fixing system 100 includes the holding member 33 slid onto the spoke 3 and the spoke nipple 31 screwed onto the spoke end to form an assembled unit 13. The assembled unit 13 is firstly inserted with the rim flange 48a or 48b into the spoke hole 50 in the tilted position 102 shown in FIG. 13 where the assembled unit and more specifically, the holding member 33 is tilted at an angle relative the rim base 52. Thereafter the spoke 3 is tilted back to assume the tilted back position 101 (see FIG. 11), in which the rim flanges 48a or 48b are generally parallel to the rim base 52 and reach behind the rim base 52 to provide a large surface for absorbing and dissipating the forces occurring on the rim. The spoke fixing system and mounting the wheel according to the invention will be explained below in more detail with reference to the FIGS. 8 to 15.

The wheel according to the invention allows the use of tubeless tires since passing through the spoke nipples does not require any holes provided in the rim well. Furthermore the configuration according to the invention also offers the quite considerable advantage that the support surface of the spoke nipple 31 on the rim may be enlarged such that the rim wall may be manufactured to be thinner and thus lightweight since the load from the spokes is distributed across a larger surface.

FIG. 1 illustrates a front wheel wherein some of the spokes are positioned radially and some of the spokes 3, more tangentially on the hub. In the rear wheel illustrated in FIG. 2 at the front face in the illustration, the face where the rotor for the sprocket assembly is provided, all the spokes are orientated radially while on the rear face, four spokes extend radially, four more spokes extend tangentially to the right and four spokes to the left from the hub. On the whole this results in a design of an open crow's foot since in the side view the spokes intersect, one to the left, one to the right, and one extending radially.

The rear wheel hub 2 illustrated in FIG. 3 comprises a hub axle 7 around which the hub body 10 and the rotor 14 are rotatably mounted. The hub body 10 comprises a hub sleeve 8 and two separate hub flanges 6, 9, which are pushed onto the hub sleeve 8.

To non-rotatably receive the hub flanges 6, 9 on the hub sleeve 8, connecting members 12 are provided which are disposed on the hub flanges 6, 9 and comprise an outer thread to be screwed into an internal thread in the hub flanges.

The connecting or attachment components 12 configured as screw parts 15 each comprise a screw head 18, a screw body 19 having an external thread 16, and an inserted pin part 20 which herein is round in cross-section 21 and comprises a smooth outer surface 29 as illustrated in FIG. 7.

The screw part 15 illustrated in FIG. 7 may comprise a radially enlarged head portion 61 as shown by the dotted contours. The larger diameter head portion 61 provides a stopper to limit the depth by which the connecting member 12 can be screwed into the hub flange 6 or 9 so as to prevent that the pin part 20 exerts any force on the bearing seats 55 and 56 disposed within the hub sleeve. The length of the thread portion 62 may be smaller than the thickness of the hub flange at the thread 17 and the length of the pin portion 63 protruding from the screw body 19 may on the whole be smaller than the thickness of the hub sleeve 8 at the positions of the holes 30.

Screwing in too far may be prevented by other means as well, e.g. by way of the depth of the internal thread 17 in the hub flanges 6 and 9.

As illustrated in the FIGS. 4 and 5, the rotor 14 comprises on the external surface 24 axial driving cams 25 provided with notches 26. The axial driving cams 25 allow to non-rotatably position a sprocket assembly on the rotor 14. By way of the notches 26 the weight of the hub is reduced. In the interior of the rotor 14, bores 27 are provided which also allow a further weight reduction of the rotor without impeding the function.

FIG. 6 illustrates an exploded view of the inventive hub 2, herein configured as a rear wheel hub. The hub sleeve 8 comprises holes 30 herein designed cylindrically and serving to receive the also cylindrical pin parts 20 in an accurate fit so as to achieve an axial fixation of the hub flanges 6, 9 and to secure the hub flanges 6, 9 against rotation relative to the hub sleeve 8. It will in particular be only the pin parts 20 of the connecting members 12 which protrude into the hub sleeve 8 since they are designed for the loads occurring and preferably consist of steel.

By means of the connecting members 12 which with the pin parts 20 protrude into the holes 30 of the hub sleeve, a non-rotatable connection between hub flanges and hub sleeve is established. An axial displacement of the hub flanges relative to the hub sleeve 8 is also prohibited. At the same time, however, the pin parts 20 prevent a transmission of forces in the radial direction such that the forces acting radially on the hub flanges through the spokes will not be transmitted to the hub sleeve since the pin parts 20 in the holes 30 of the hub sleeve can move relative to one another in the radial direction.

In this exemplary embodiment, four connecting members 12 provided as screw parts 15 are provided, which are screwed from radially outwardly into threads 17 of the hub flanges 6, 9 at angular distances of 90 degrees each and whose pin parts 20 protrude radially inwardly into the openings 30 of the hub sleeve 8.

Furthermore the hub nipples 11, which serve to receive threaded ends of the spokes 3, are positioned at the hub flanges 6, 9 in holes 22 configured as threaded holes 23 substantially positioned in a plane substantially transverse to the extension of the hub axle 7.

In preferred configurations the hub nipples 11 may be provided at the same peripheral positions as are the connecting members 12, with the hub nipples 11 then positioned radially farther outwardly such that the connecting members 12 are not visible from outside.

As can clearly be seen in FIG. 6, the modular structure of the inventive hubs 2 is simple on the whole. Since no complicated and heavy axial clamping parts need to be provided, the entire structure may be configured to be very lightweight.

FIG. 8 illustrates a top view of a portion of the rim base 52 of the rim 4 which comprises a rim hole 50. Said rim hole 50 comprises parallel longitudinal edges 50a and 50b, and rounded transverse edges 50c and 50d. The rim hole extends in the peripheral direction of the rim such that the length in the peripheral direction is considerably larger than the width in the axial direction of the rim.

The dimensions of the holding member 33 illustrated in FIG. 9 in a top view are matched to the rim hole 50 according to FIG. 8. The external dimensions of the hole cover 49 of the holding member 33 substantially correspond to the external dimensions of the rim hole 50, wherein care is taken for the hole cover 49 to be insertable into the rim hole 50, thus closing the rim hole 50. When closed, the rim flanges 48*a* and 48*b* reach behind the rim base 52 so as to be positioned in the hollow portion of the rim, being invisible from outside.

What is visible in the assembled state is the hole cover 49 which follows the rim base 52 substantially seamlessly, and the reinforcement ring 54 provided to reinforce the through bore or the through hole 45 of the holding member 33. In other embodiments it is conceivable to provide the reinforcement ring 54 on the other side of the holding member 33 such that the rim base forms one single, continuous surface through which the spokes protrude radially inwardly.

Both embodiments allow to achieve high sturdiness such that the structural designing may focus on the optical appearance.

The rear face of the holding member 33 (as illustrated in FIG. 9) is, as indicated in dashed lines, provided with the rounded or hemispherical nipple head seat 44 which serves to receive the rounded or hemispherical nipple head 43 of the spoke nipple 31.

FIG. 10 illustrates a perspective view of a rim portion 4 comprising a rim hole 50 and a holding member 33 received therein, in which a spoke 3 is held by way of a spoke nipple 31. As can be seen, the holding member 33 with the spoke nipple 31 is disposed in the rim base 52 with the rim flanks 57 and 58 adjacent in the lateral directions. The rim flanks 57 and 58 may protrude beyond the rim well 51 in the radial direction, thus forming rim flanges.

FIG. 11 shows an enlarged illustration of a lateral cross-section through the rim base 52 wherein the cross-section shapes of the holding member 33 and spoke nipple 31 can be seen.

The hole cover 49 forms a continuation of the rim base 52 until the annular reinforcement ring 54 protrudes radially inwardly. At the center of the reinforcement ring 54 the through bore 45 is provided with the rounded nipple head seat 44 disposed at its radially outwardly end with the rounded support surface 47 of the rounded or hemispherical nipple head 43 disposed in said seat. The seat of the spoke nipple 31 in the holding member 33 is shown in FIG. 12 in a still further enlarged illustration. One can recognize that the spoke 3 is screwed with its tip into the thread 38 of the spoke nipple. The thread 38 extends over a length 38*a*, while the radially inwardly or first end 35 of the spoke nipple 31 is provided with an unthreaded portion in the spoke nipple over a length 37. While the through hole 36 has a diameter 36*b*, the threadless portion 37 has a diameter 36*a* which is larger than the diameter 36*b*.

Furthermore the through hole 45 in the holding member 33 has a diameter 45*a* that is larger than the outer diameter 46*a* of the nipple body 46 which extends through the through hole 45.

An interaction of the rounded nipple head seat 44 with the correspondingly rounded support surface 47 of the nipple head 43 and the different diameters of the through hole 45 and the nipple body 46 allow an angularly variable orientation of the spokes. A fixed, non-variable tensioning of the spoke nipple in the holding member as was usual in the prior art can, however, trigger high shearing and buckling forces in the spoke which result in a clearly increased risk of spoke breakage. The configuration according to the invention reduces an optimal spoke orientation due to the possible angular orientation, so as to eliminate hazardous tensions.

The unthreaded portion 37 preferably extends over at least 10% of the length 31*a* of the spoke nipple, preferably over a range between 20% and 40% of the length of the spoke nipple.

Other embodiments provide for the holding member to comprise support surfaces 48*a* and 48*b* not only at the ends 33*c* and 33*d* but also on the broad sides 33*a* and 33*b*, wherein in this case the holding surfaces reach beneath the longitudinal edges 50*a* and 50*b*. This embodiment allows a full surface support at the spoke hole 50. In such a case, assembly requires a matched geometry and a three-dimensional tilted insertion into the spoke hole.

What is also conceivable and preferred is, to dispose holding surfaces in the shape of support surfaces or rim flanges on three sides to facilitate insertion into the spoke hole.

FIG. 14 is an enlarged illustration of a separate hub flange 6 into which a hub nipple 11 with a spoke 3 is screwed.

Other configurations may employ hub flanges 6 or 9 which are provided with a receiving means to receive additional components. Over this, for example a disc brake may in particular be positioned at the hub flange. It is likewise possible to provide the hub sleeve 8 with more holes 30 which are preferably also configured cylindrically and serve to receive more, accurately fitted pin parts 20 over which another hub flange can be positioned for carrying e.g. a disc brake. Due to the modular structure the inventive hub is flexible in terms of extensions.

FIG. 15 is an enlarged illustration of the section A-A from FIG. 14. The hub nipple 11 comprises a through hole 41 having a thread 42 for the spoke 3 to be screwed in. At the end of the hub nipple facing the spoke, the diameter of the bore 41 is larger than the diameter of the thread 42 over a portion 40.

The invention claimed is:

1. A wheel for a bicycle, comprising:
a rim and having a hub comprising a fixed hub axle and a hub body rotatably mounted relative to the hub axle, and having a plurality of spokes disposed between the hub body and the rim to non-rotatably connect the rim with the hub body,
wherein the rim comprises two rim flanks, a rim well and a rim base with spoke holes, in which the spokes are received, each of said spoke holes having a diameter;
a separate holding member configured to receive a spoke nipple attached to one of the spokes, said holding member including an upper portion forming a hole cover, said hole cover having a width corresponding to said diameter of one of said spoke holes;
an assembled unit including the holding member, the spoke nipple and an end of the attached spoke connected together, the assembled unit being mounted to the rim in a tilted-back position and removed from the rim in a tilted position, while in the tilted-back position, the assembled unit contacts the rim in which it is received to be tension-proof so as to fix the spoke to the rim, and
wherein the holding member of the assembled unit includes two symmetrical rim flanges, each of the rim flanges extending at least partially behind said rim base, and said hole cover has a surface that is flush with a surface of the rim base and seals the spoke hole when the assembled unit is in the tilted-back position, wherein a length from an end of one of said rim flanges to an end of the other of said rim flanges is greater than a diameter of the largest cross-section of the spoke nipple transverse to the spoke;

the spoke holes comprise an elongated shape and extend to be longer in the peripheral direction of the wheel than in the axial direction, wherein the spoke nipple includes a nipple body having an outside diameter and the holding member defines a through hole having an inside diameter, the inside diameter of the through hole being sufficiently greater than the outside diameter of the nipple body so as to define an annular space between said nipple body and said through hole to allow an angularly variable orientation of the'spoke relative to the rim, to which end a rounded nipple head is received in a rounded nipple head seat of the holding member, said annular space being dimensioned to allow said angularly variable orientation after said nipple head is seated in said nipple head seat; and wherein when the assembled unit is in its tilted-back position, the support surfaces each contact the rim base and the nipple head of the spoke nipple is securely seated in the nipple head seat of the holding member.

2. The wheel according to claim 1, wherein the nipple head is disposed without play in the nipple head seat.

3. The wheel according to claim 1, wherein the nipple head comprises a ball-shaped support surface and/or wherein the nipple head seat comprises a ball-shaped support area.

4. The wheel according to claim 1, wherein the nipple body defines a through hole that includes an inner thread for fixing the spoke wherein the inner thread extends only over part of the length of the spoke nipple.

5. The wheel according to claim 4, wherein the through hole defined by the nipple body comprises at its end opposite the nipple head, a threadless portion with an enlarged inner diameter over a length to maintain a radial distance from the spoke over said length.

6. The wheel according to claim 1, wherein the holding member comprises parallel longitudinal sides and rounded ends.

7. The wheel according to claim 1, wherein a thickness of the holding member is larger than a thickness of the rim base.

8. The wheel according to claim 1, wherein the hub comprises a hub sleeve and two separate hub flanges and the spokes are fixed to the separate hub flanges which by way of radial connecting members are connected with the hub sleeve.

9. The wheel according to claim 1, wherein the spokes are connected with the hub through hub nipples.

10. The spoke fixing system according to claim 1, wherein the holding member consists of a lightweight material.

11. The spoke fixing system according to claim 10, wherein the lightweight material is a light metal.

12. A spoke assembly for a wheel of a bicycle, comprising:
a rim having a plurality of spoke holes, each of said holes having a diameter;
an assembled unit including a holding member, a spoke nipple and an end of a spoke secured together, the assembled unit being movable between a tilted-back position, wherein the assembled unit is mounted to the wheel, and a tilted position, wherein the assembled unit is disconnected from the wheel;
said holding member comprising an elongated shape, and when mounted, extending so as to be longer in a peripheral direction than in an axial direction of the wheel,
said holding member including a hole cover having a width corresponding to said diameter of one of said plurality of spoke holes, wherein said hole cover has a surface that is flush with a surface of the rim when the assembled unit is in the tilted-back position,
wherein the spoke nipple includes a nipple body having an outside diameter and the holding member defines a through hole having an inside diameter, the inside diameter of the through hole being sufficiently greater than the outside diameter of the nipple body so as to define an annular space between said nipple body and said through hole to allow an angularly variable orientation relative to one another, to which end a rounded nipple head is received in a rounded nipple head seat of the holding member, said annular space being dimensioned to allow said angularly variable orientation after said nipple head is seated in said nipple head seat.

13. The spoke fixing system according to claim 12, wherein the holding member comprises at its two ends a flange each, which are intended to reach behind the rim base when mounted.

14. The spoke fixing system according to claim 13, wherein the holding member includes longitudinal sides that are parallel and the flanges are located at the transverse sides of the holding member.

15. The spoke fixing system according to claim 12, wherein the holding member consists of a fiber-reinforced plastic.

16. A method for mounting a spoke assembly to a wheel rim of a bicycle, the method comprising the steps of:
providing an assembled unit including a holding member, a spoke nipple and an end of a spoke secured together;
inserting the assembled unit through a spoke hole in the wheel rim in a tilted position;
mounting the assembled unit to the wheel rim by moving the assembled unit from the tilted position to a tilted-back position, wherein a portion of said holding member matingly engages said spoke hole; and
adjusting an angle of said spoke by moving said spoke relative to said wheel rim after the assembled unit is mounted to the wheel rim.

17. The method of claim 16 further comprising changing an angular orientation of the spoke relative to the wheel rim after the assembled unit is mounted to the wheel rim.

* * * * *